(12) United States Patent
Huang

(10) Patent No.: US 9,501,120 B2
(45) Date of Patent: Nov. 22, 2016

(54) POWER SUPPLY CIRCUIT OF UNIVERSAL SERIAL BUS AND ELECTRONIC DEVICE HAVING THE CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 36 days.

(21) Appl. No.: 14/690,987

(22) Filed: Apr. 20, 2015

(65) Prior Publication Data

US 2016/0202751 A1 Jul. 14, 2016

(30) Foreign Application Priority Data

Jan. 8, 2015 (CN) .......................... 2015 1 0008594

(51) Int. Cl.
*G06F 1/26* (2006.01)
*G06F 1/32* (2006.01)

(52) U.S. Cl.
CPC ................. *G06F 1/26* (2013.01); *G06F 1/263* (2013.01); *G06F 1/266* (2013.01); *G06F 1/3287* (2013.01)

(58) Field of Classification Search
CPC .......... G06F 1/26; G06F 1/266; G06F 1/263; G06F 1/3287
See application file for complete search history.

(56) References Cited

U.S. PATENT DOCUMENTS

| | | | | |
|---|---|---|---|---|
| 7,193,442 B2* | 3/2007 | Zhu | ...................... | G06F 13/4081 326/102 |
| 7,930,461 B2* | 4/2011 | Tsuji | ...................... | G06F 1/266 710/110 |
| 2013/0062950 A1* | 3/2013 | Dangy-Caye | ........... | G06F 1/266 307/64 |
| 2013/0313914 A1* | 11/2013 | Hou | ...................... | G06F 1/266 307/115 |

* cited by examiner

*Primary Examiner* — Stefan Stoynov
(74) *Attorney, Agent, or Firm* — Zhigang Ma

(57) ABSTRACT

A power supply circuit includes first to third electronic switches, first to sixth resistors, and a first capacitor. The power supply circuit is coupled to a USB interface. A control terminal of the first electronic switch is utilized to receive a control signal. A first terminal of the first electronic switch is coupled to a standby power supply. The standby power supply is also coupled to ground through the first capacitor. The second electronic switch is coupled to the first electronic switch. The third electronic switch is coupled between the second electronic and the USB interface. The disclosure further provides an electronic device having the circuit.

13 Claims, 1 Drawing Sheet

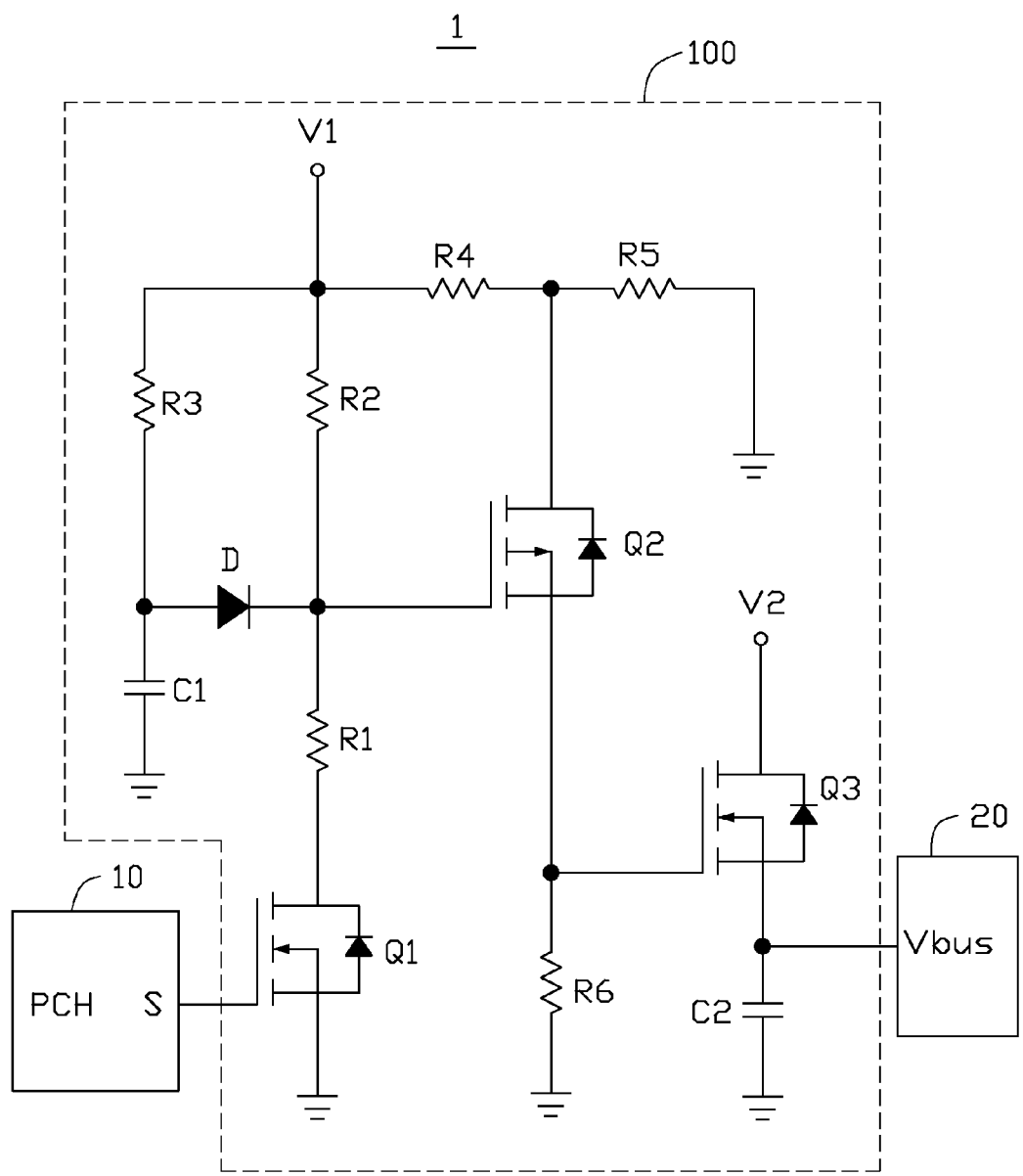

POWER SUPPLY CIRCUIT OF UNIVERSAL SERIAL BUS AND ELECTRONIC DEVICE HAVING THE CIRCUIT

FIELD

The subject matter herein generally relates to a power supply circuit of a universal serial bus (USB) and an electronic device having the circuit.

BACKGROUND

Inrush current refers to the maximum instantaneous input currents, which are generated by a USB device when the USB device is coupled to a USB interface of an electronic device.

BRIEF DESCRIPTION OF THE DRAWINGS

Implementations of the present technology will now be described, by way of example only, with reference to the attached FIGURE.

The FIGURE is a circuit diagram of an example embodiment of an electronic device.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to an electronic device.

The FIGURE illustrates an electronic device 1 that supplies power to a USB device. The electronic device 1 can comprise a power supply circuit 100, a platform controller hub (PCH) 10, and a USB interface 20.

The power supply circuit 100 is configured to power to the USB device through the USB interface 20 controlled by the PCH 10. The power supply circuit 100 can comprise resistors R1-R6, capacitors C1, C2, a diode D, and electronic switches Q1, Q2, Q3.

A control terminal of the electronic switch Q1 is coupled to a control pin S of the PCH 10. A first terminal of the electronic switch Q1 is coupled to a power supply V1 through the resistor R1 and the resistor R2 in series. A second terminal of the electronic switch Q1 is coupled to ground. The power supply V1 is also coupled to ground through the resistor R3 and the capacitor C1 in series. A node between the resistor R3 and the capacitor C1 is coupled to an anode of the diode D. A cathode of the diode D is coupled to a node between the resistor R1 and the resistor R2. A control terminal of the electronic switch Q2 is coupled to the node between the resistor R1 and the resistor R2. A first terminal of the electronic switch Q2 is coupled to the power supply V1 through the resistor R4. The first terminal of the electronic switch Q2 is also coupled to ground through the resistor R5. A second terminal of the electronic switch Q2 is coupled to ground through the resistor R6. A control terminal of the electronic switch Q3 is coupled to the second terminal of the electronic switch Q2. A first terminal of the electronic switch Q3 is coupled to a power supply V2. A second terminal of the electronic switch Q3 is coupled to ground through the capacitor C2. The second terminal of the electronic switch Q3 is also coupled to a power pin Vbus of the USB interface 20. In at least one embodiment, the power supply V1 is a standby power supply.

The capacitor C1 is charged by the power supply V1 when the electronic device 1 is in standby. When the electronic device 1 is booted up and the power supply V2 is powered on, the control terminal of the electronic switch Q1 receives a high level signal output from the control pin S of the PCH 10 and the electronic switch Q1 is turned on. The capacitor C1 is discharged through the resistor R1 and the electronic switch Q1. At the same time, the electronic switch Q2 and the electronic switch Q3 are turned off.

The electronic switch Q2 is turned on with the discharging of the capacitor C1 and the electronic switch Q3 is turned on. The power supply V2 powers the USB interface 20.

In at least one embodiment, the electronic switches Q1, Q3 can be n-channel field effect transistors, and the electronic switch Q2 can be an p-channel field effect transistor.

When the power supply V2 is powered on, the power supply V2 does not immediately supply power to the USB interface 20 and avoids an inrush current.

The embodiment shown and described above is only example. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power supply circuit comprising:
    a first resistor, a second resistor, a third resistor, a fourth resistor, a fifth resistor, and a sixth resistor;
    a first capacitor;
    a first electronic switch comprising a first terminal, a second terminal, and a control terminal, wherein the control terminal is configured to receive a control signal, the first terminal is coupled to a standby power supply through the first resistor and the second resistor, the standby power supply is also coupled to ground through the third resistor and the first capacitor, a node between the third resistor and the first capacitor is coupled to a node between the first resistor and the second resistor, and the second terminal is coupled to ground;

a second electronic switch comprising a first terminal, a second terminal, and a control terminal, wherein the control terminal is coupled to the node between the first resistor and the second resistor, the first terminal is coupled to the standby power supply through the fourth resistor, the first terminal is also coupled to ground through the fifth resistor, and the second terminal is coupled to ground through the sixth resistor; and a third electronic switch comprising a first terminal, a second terminal, and a control terminal, wherein the control terminal is coupled to the second terminal of the second electronic switch, the first terminal is coupled to a power supply, and the second terminal is coupled to ground, the second terminal is also coupled to a power pin of a USB interface;

wherein when the power supply is powered off, the control signal is a low level signal and the first electronic switch is turned off, when the power supply is powered on, the control signal is a high level signal and the first electronic switch is turned on; wherein in response to the control terminal of the second electronic switch receiving a low level signal, the second electronic switch is turned on, and the third electronic switch is turned on.

2. The power supply circuit of claim 1, further comprising a platform controller hub (PCH), wherein the control terminal of the first electronic switch is coupled to the PCH for receiving the control signal.

3. The power supply circuit of claim 1, further comprising a diode, wherein an anode of the diode is coupled to the node between the third resistor and the first capacitor, and a cathode of the diode is coupled the node between the first resistor and the second resistor.

4. The power supply circuit of claim 1, further comprising a second capacitor, wherein the second terminal of the third electronic switch is coupled to ground through the second capacitor.

5. The power supply circuit of claim 1, wherein the first electronic switch is an n-channel field effect transistor.

6. The power supply circuit of claim 1, wherein the second electronic switch is a p-channel field effect transistor.

7. The power supply circuit of claim 1, wherein the third electronic switch is an n-channel field effect transistor.

8. An electronic device comprising:
a platform controller hub (PCH);
a USB interface; and
a power supply circuit comprising:
  a first resistor, a second resistor, a third resistor, a fourth resistor, a fifth resistor, and a sixth resistor;
  a first capacitor;
  a first electronic switch comprising a first terminal, a second terminal, and a control terminal, wherein the control terminal is coupled to the PCH for receiving a control signal, the first terminal is coupled to a standby power supply through the first resistor and the second resistor, the standby power supply is also coupled to ground through the third resistor and the first capacitor, a node between the third resistor and the first capacitor is coupled to a node between the first resistor and the second resistor, and the second terminal is coupled to ground;
  a second electronic switch comprising a first terminal, a second terminal, and a control terminal, wherein the control terminal is coupled to the node between the first resistor and the second resistor, the first terminal is coupled to the standby power supply through the fourth resistor, the first terminal is also coupled to ground through the fifth resistor, and the second terminal is coupled to ground through the sixth resistor; and
  a third electronic switch comprising a first terminal, a second terminal, and a control terminal, wherein the control terminal is coupled to the second terminal of the second electronic switch, the first terminal is coupled to a power supply, and the second terminal is coupled to ground, the second terminal is also coupled to a power pin of the USB interface;
  wherein when the power supply is powered off, the control signal is a low level signal and the first electronic switch is turned off, when the power supply is powered on, the control signal is a high level signal and the first electronic switch is turned on; wherein in response to the control terminal of the second electronic switch receiving a low level signal, the second electronic switch is turned on, and the third electronic switch is turned on.

9. The electronic device of claim 8, further comprising a diode, wherein an anode of the diode is coupled to the node between the third resistor and the first capacitor, and a cathode of the diode is coupled the node between the first resistor and the second resistor.

10. The electronic device of claim 8, further comprising a second capacitor, wherein the second terminal of the third electronic switch is coupled to ground through the second capacitor.

11. The electronic device of claim 8, wherein the first electronic switch is an n-channel field effect transistor.

12. The electronic device of claim 8, wherein the second electronic switch is a p-channel field effect transistor.

13. The electronic device of claim 8, wherein the third electronic switch is an n-channel field effect transistor.

* * * * *